US010043242B2

(12) United States Patent
Matson et al.

(10) Patent No.: US 10,043,242 B2
(45) Date of Patent: Aug. 7, 2018

(54) METHOD AND APPARATUS FOR SYNTHESIS OF HIGHER RESOLUTION IMAGES

(71) Applicant: MBDA UK LIMITED, Stevenage Hertfordshire (GB)

(72) Inventors: Gary Paul Matson, Bristol South Gloucestershire (GB); Andrew John Sherriff, Bristol South Gloucestershire (GB); Robert James Middleton, Bristol South Gloucestershire (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 0 days.

(21) Appl. No.: 14/908,625

(22) PCT Filed: Jul. 30, 2014

(86) PCT No.: PCT/GB2014/052328
§ 371 (c)(1),
(2) Date: Jan. 29, 2016

(87) PCT Pub. No.: WO2015/015195
PCT Pub. Date: Feb. 5, 2015

(65) Prior Publication Data
US 2016/0171658 A1    Jun. 16, 2016

(30) Foreign Application Priority Data
Jul. 31, 2013  (GB) .................................. 1313681.7

(51) Int. Cl.
*G06T 3/40* (2006.01)
*G06T 5/50* (2006.01)
(Continued)

(52) U.S. Cl.
CPC .......... *G06T 3/4076* (2013.01); *G06T 3/4053* (2013.01); *G06T 3/4069* (2013.01);
(Continued)

(58) Field of Classification Search
CPC ......... G06T 3/4076; G06T 5/003; G06T 5/50; G06T 2207/20216; G06T 3/4053
See application file for complete search history.

(56) References Cited

U.S. PATENT DOCUMENTS

| H1914 H | 11/2000 | Watkins |
| 6,483,538 B2 | 11/2002 | Hu |

(Continued)

FOREIGN PATENT DOCUMENTS

| EP | 2575104 A1 | 4/2013 |
| JP | 2005071223 A | 3/2005 |

(Continued)

OTHER PUBLICATIONS

Duda et al. ("Computationally simple Super-Resolution algorithm for video from endoscopic capsule," International Conference on Signals and Electronic Systems, Sep. 14-17, 2008).*
(Continued)

*Primary Examiner* — Yubin Hung
(74) *Attorney, Agent, or Firm* — Scully, Scott, Murphy & Presser, PC

(57) ABSTRACT

An image-processing method includes obtaining an image including a target object, the image being formed by an array of pixels. A current frame portion is extracted from the image, the frame portion being at least a portion of the pixels forming the image, corresponding to a region of interest in the image, the region of interest comprising the target object. A previously calculated current super-resolved frame portion is provided, corresponding to the region of interest in the image. An updated super-resolved frame portion is
(Continued)

calculated from the current frame portion and the current super-resolved frame portion.

15 Claims, 3 Drawing Sheets

(51) Int. Cl.
    *G06T 5/00*      (2006.01)
    *G06T 7/11*      (2017.01)

(52) U.S. Cl.
    CPC ............... *G06T 5/003* (2013.01); *G06T 5/50* (2013.01); *G06T 7/11* (2017.01); *G06T 2207/20216* (2013.01)

(56) References Cited

U.S. PATENT DOCUMENTS

| | | | |
|---|---|---|---|
| 6,987,256 B2 | 1/2006 | English et al. | |
| 7,860,344 B1 | 12/2010 | Fitzpatrick et al. | |
| 9,036,943 B1 | 5/2015 | Baldwin | |
| 9,142,251 B2 | 9/2015 | Yang et al. | |
| 9,792,669 B2 | 10/2017 | Matson et al. | |
| 2002/0097342 A1* | 7/2002 | Hu | G06T 7/32 348/700 |
| 2006/0012830 A1* | 1/2006 | Aiso | G06T 3/4053 358/3.27 |
| 2007/0058717 A1 | 3/2007 | Chosak et al. | |
| 2008/0130962 A1* | 6/2008 | Lee | G06K 9/00275 382/118 |
| 2008/0199078 A1* | 8/2008 | Lam | G06T 7/337 382/190 |
| 2009/0046902 A1* | 2/2009 | Williams | F41G 7/007 382/119 |
| 2009/0257683 A1* | 10/2009 | Cloud | G06T 3/4053 382/299 |
| 2009/0262977 A1* | 10/2009 | Huang | G06T 7/20 382/103 |
| 2009/0297059 A1 | 12/2009 | Lee et al. | |
| 2010/0014709 A1* | 1/2010 | Wheeler | G06K 9/0063 382/103 |
| 2010/0172556 A1 | 7/2010 | Cohen et al. | |
| 2010/0259607 A1* | 10/2010 | Kennedy | F41G 7/2253 348/113 |
| 2011/0012900 A1 | 1/2011 | Rotem et al. | |
| 2011/0170784 A1 | 7/2011 | Tanaka et al. | |
| 2012/0051667 A1 | 3/2012 | Kang et al. | |
| 2012/0141042 A1 | 6/2012 | Iketani | |
| 2012/0230555 A1 | 9/2012 | Miura et al. | |
| 2013/0077821 A1 | 3/2013 | Chen et al. | |
| 2013/0084027 A1* | 4/2013 | Koga | G06T 3/4053 382/299 |
| 2013/0163851 A1* | 6/2013 | Dalla-Torre | G06T 7/001 382/149 |
| 2014/0064586 A1 | 3/2014 | Peacock, III et al. | |

FOREIGN PATENT DOCUMENTS

| | | | |
|---|---|---|---|
| WO | WO 2009/091259 A1 | 7/2009 | |
| WO | 2009/126445 A1 | 10/2009 | |
| WO | WO 2009/126445 A1 | 10/2009 | |

OTHER PUBLICATIONS

Reddy et al. ("An efficient real time superresolution ASIC system," Proc. SPIE 6957, Enhanced and Synthetic Vision, Apr. 15, 2008).*
International Preliminary Report on Patentability together with the Written Opinion from related International Application No. PCT/GB2014/052328 dated Feb. 11, 2016.
International Search Report dated Nov. 19, 2014 issued in PCT/GB2014/052328.
GB Search Report dated Feb. 3, 2014 issued in GB 1313681.7.
U.S. Appl. No. 14/908,641, filed Jan. 29, 2016.
International Search Report dated Nov. 19, 2014 issued in PCT/GB2014/052327.
GB Search Report dated Feb. 13, 2014 issued in GB 1313682.5.
International Preliminary Report on Patentability together with the Written Opinion from related International Application No. PCT/GB2014/052327 dated Feb. 11, 2016.
Office Action dated May 17, 2017 from related U.S. Appl. No. 14/908,641, filed Jan. 29, 2016.
Notice of Allowance dated Oct. 31, 2017 from related U.S. Appl. No. 14/908,641, filed Jan. 29, 2016.
International Preliminary Report on Patentability together with the Written Opinion from related International Application No. PCT/GB2014/052329 dated Feb. 11, 2016.
International Search Report dated Nov. 19, 2014 issued in PCT/GB2014/052329.
GB Search Report dated Jan. 31, 2014 issued in GB1313680.9.
Park, Sung Cheol et al., "Super-Resolution Image Reconstruction: A Technical Overview", IEEE Signal Processing Magazine (May 1, 2003), vol. 20, No. 3, pp. 21-36.
Notice of Allowance dated Jun. 15, 2017 from related U.S. Appl. No. 14/908,624 (now U.S. Pat. No. 9,792,669).
Bailey, D. ("Super-resolution for bar codes," J. Electronic Imaging 10(1), 213-330, Jan. 2001).
Roeder et al. (Assessment of super-resolution for face recognition from very-low resolution images in sensor network, Proc. of SPIE, vol. 7341, 2009).
Office Action dated Jan. 6, 2017 from related U.S. Appl. No. 14/908,624 (Now U.S. Pat. No. 9,792,669).

* cited by examiner (a)                    (b)

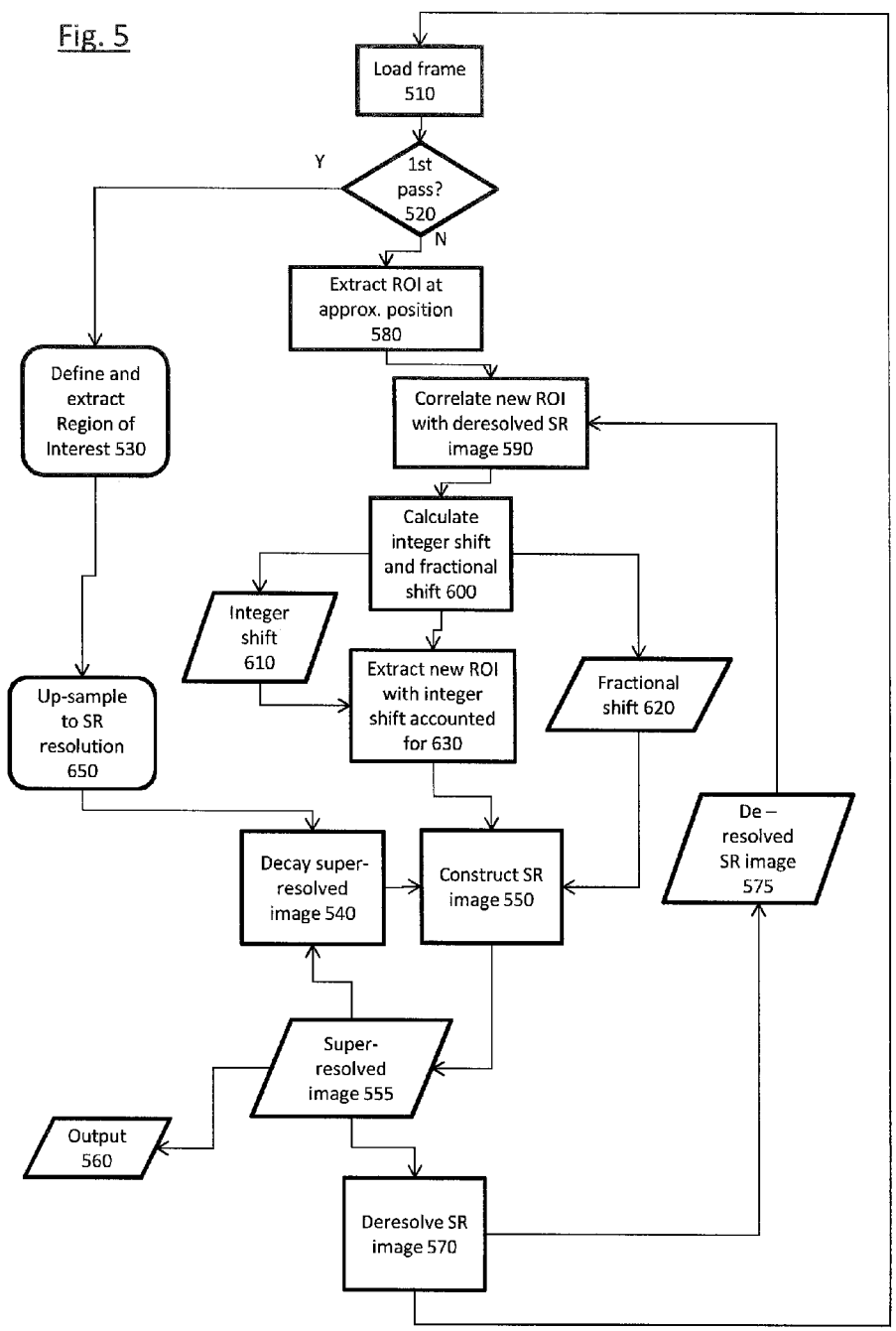

METHOD AND APPARATUS FOR SYNTHESIS OF HIGHER RESOLUTION IMAGES

FIELD OF THE INVENTION

This invention relates to the field of image processing, and in particular to the generation of a higher-resolution image from a plurality of lower-resolution images. The invention relates especially, but not exclusively, to the field of image-processing in homing missiles.

BACKGROUND OF THE INVENTION

The accuracy of detection, recognition, identification and tracking using electro-optical sensors is critically dependent upon image quality; hence improved image quality can be expected to result in increased performance. However, in some applications there is a need to strike a balance between, on the one hand, obtaining the best possible image quality and, on the other hand, obtaining an image quickly and with processor and other hardware requirements that are not too demanding. For example, in the field of homing missiles, provision of images of higher quality than those provided by existing systems would increase the distance over which an image processing system associated with the missile can operate successfully, allowing the operator to fire earlier and remain out of harm's way, and/or would reduce cost, weight and development risk. However, homing missiles are typically of limited size and weight, and travel at very high velocity relative to their target, and there are therefore significant limitations on the image-processing techniques that can be used. Several prior-art image processing techniques that provide high quality images are slow and computationally demanding.

It would be advantageous to provide a method and apparatus for image processing in which the aforementioned disadvantages are reduced or at least ameliorated.

DISCLOSURE OF THE INVENTION

A first aspect of the invention provides an image-processing method comprising the steps of:
 (i) obtaining an image including a target object, the image being formed by an array of pixels;
 (ii) extracting a current frame portion from the image, the frame portion being at least a portion of the pixels forming the image, corresponding to a region of interest in the image, the region of interest comprising the target object;
 (iii) providing a previously calculated current super-resolved frame portion, corresponding to the region of interest in the image; and
 (iv) calculating an updated super-resolved frame portion from the current frame portion (i.e. not being a super-resolved frame portion) and the current super-resolved frame portion.

It may be that in the step of calculating the updated super-resolved frame portion from the current frame portion and the current super-resolved frame portion, the current frame portion and the current super-resolved frame are weighted relative to each other, for example with respective weightings, in the calculation. The weightings may be predetermined. The respective weightings (i.e. for the current frame portion and the current super-resolved frame) may be constant for a given embodiment/performance of the method. It may be that the method further comprises repeating steps (i) to (iv) a plurality of times, so that steps (i) to (iv) of the method are repeated for successive images. The weightings given in the calculation of the super-resolved image may be such that in effect the contribution a given frame portion makes to the super-resolved image effectively decreases from one calculation of the super-resolved image to the next. The method may be so performed that the contribution that a single given frame portion effectively makes to the super-resolved image progressively decreases over a multiplicity of repetitions (for example five or more, or perhaps ten or more, such repetitions) of steps (i) to (iv). The method may be so performed that the contribution that a given frame portion effectively makes to the calculation of the super-resolved image progressively decreases from one calculation of the super-resolved image to the next for all frame portions effectively used in the calculation. Thus, the weight effectively given in the calculation of the super-resolved image to the current frame portion may be greater than the weight effectively given in the calculation to any previous frame portion. It will be appreciated that in certain embodiments, previous frame portions may not be individually weighted, or indeed individually used in the calculation. The method of such embodiments may simply use the previous calculated current super-resolved frame portion (that is effectively a combination of previous frame portions) and the current frame portion.

It may be that the respective weightings used in the calculation of each of the successive updated super-resolved frame portions are such that the effective contribution made to the super-resolved frame portion by a given frame portion progressively decays with each successive calculated super-resolved frame portion. It may be that the calculation of the updated super-resolved frame portion uses a decayed current super-resolved frame portion. It may be that the current super-resolved frame portion is decayed by giving it a lower weighting in the calculation of the updated super-resolved frame portion than a weighting given to the current frame portion. Such a relative weighting may result in the most recent frame portions having greater significant weight than older frame portions. As such, the current super-resolved frame portion may effectively relatively quickly decay with time. It may be that the current super-resolved frame portion is decayed by giving each pixel in the current super-resolved frame portion a lower weighting than a weighting given to each pixel in the current frame portion.

It may be that the current super-resolved frame portion is decayed by giving it a higher weighting in the calculation of the updated super-resolved frame portion than a weighting given to the current frame portion. Such a relative weighting may result in previous frame portions collectively having relatively greater weight than newer frame portions. As such, the current super-resolved frame portion may effectively relatively slowly decay with time.

It may be that the value $S_{x,y}{}^n$ of the pixel at (x,y) in the updated super-resolved frame portion calculated in the nth iteration of the method is:

$$S_{x,y}^n = (1-\alpha)F_{x,y}^n + \alpha S_{x,y}^{n-1}$$
$$= (1-\alpha)F_{x,y}^n + \alpha((1-\alpha)F_{x,y}^{n-1} + \alpha S_{x,y}^{n-2})$$
$$= (1-\alpha)F_{x,y}^n + \alpha((1-\alpha)F_{x,y}^{n-1} + \alpha((1-\alpha)F_{x,y}^{n-2} + \alpha S_{x,y}^{n-3})) = \ldots$$
$$= \alpha^{n-1}F_{x,y}^1 + (1-\alpha)\cdot(a^{n-2}F_{x,y}^2 + \ldots \alpha^2 F_{x,y}^{n-2} + \alpha F_{x,y}^{n-1} + F_{x,y}^n)$$

-continued $$= \alpha^{n-1} F_{x,y}^1 + (1-\alpha) \sum_{p=2}^{n} \alpha^{n-p} F_{x,y}^p$$

where $F_{x,y}^n$ is the (x,y) pixel of the current (i.e. nth iteration) frame portion and $\alpha$ is a constant decay factor, where $0<\alpha<1$, and $S_{x,y}^1 = F_{x,y}^1$. It will be seen that in the case where $\alpha=0.5$, the weighting applied to the current super-resolved frame portion is equal to the weighting applied to the current frame portion.

It may be that the frame portion extracted in each iteration of step (ii) after the first iteration corresponds to a region of interest identified in the image used in the first iteration of step (ii).

Creating super-resolved images from a plurality of images is a known technique for synthesising a higher resolution image from a plurality of lower-resolution images. It is used for example in astronomy to generate significant improvements in the resolution of objects of astronomical interest. However, known super-resolution techniques, for example in astronomy, are composites of many images and are slow and require a great deal of computer processing power. Advantageously, the method of the invention is a method of generating super-resolved images that is quicker and less computationally demanding than such prior-art techniques. In some embodiments, it is capable of providing super-resolved images even of objects in rapid motion relative to the detector. Advantageously, the method may provide the super-resolved frame portions in real time.

It may be that the method is carried out using, for example, an imager and at least one general- or special-purpose microprocessor.

This method also has the particular advantage of a low requirement for computer memory. In calculating the updated super-resolved frame portion in a given iteration, it may be that the method takes into account data contained in frame portions obtained in previous iterations, but does not need to store those frame portions, or even the relevant portions of them, in memory; all of the relevant information is contained within the previously calculated current super-resolved frame portion.

It may be that the region of interest is defined in a first image obtained from the imager. It may be that the region of interest is defined by an operator. It may be that the region of interest is defined by an algorithm, for example an object-recognition algorithm.

It may be that the region of interest is assumed to be in the current image at the position of the region of interest in a previous image.

It may be that the target is identified in a first image obtained from the imager. It may be that the target is identified in the image by an operator. It may be that the target is identified in the image by a target recognition algorithm.

It may be that the target object is assumed to be in the current image at the position of the target object in a previous image. It may be that the target is tracked between images.

It may be the super-resolution frame portion is constructed using a registration computed from tracking.

It may be that the translation shift between the current frame portion and the current super-resolved frame portion is calculated by a correlation in the spatial domain. It may be that translation shift between the current frame portion and the current super-resolved frame portion is calculated by phase correction in the frequency domain. It may be that the translational shift between the current frame portion and the current super-resolved frame portion is calculated by an iterative method in which the result of one of the two previous methods is used as an initial guess to constructed an estimated super resolved frame portion and the registration is iterated to produce the optimal super resolved frame portion.

It may be that the position of the target in the image is determined using cross-correlation. It may be that the cross-correlation is with a de-resolved version of a super resolution frame portion calculated in a previous iteration of the method. It may be that the cross-correlation is with a de-resolved version of the previously calculated current super-resolved frame portion.

It may be that a shift in the position of the target object in successive images is calculated, and the integer part of the calculated shift is used to shift the region of interest in the later image relative to the position of the region of interest in the earlier image.

It may be that a working frame portion is extracted from the image. It may be that a working frame portion is extracted from the image and used to identify the location of the region of interest. It may be that the working frame portion is extracted from the approximate location of the target object, for example the same set of pixel locations as were extracted to form the previous frame portion. It may be that the working frame portion is cross-correlated with the de-resolved previously calculated super-resolved frame portion. It may be that the change in position of the target in the working frame portion compared with the position of the target in the de-resolved previously calculated super-resolved frame portion is thereby obtained. It may be that that change in position is broken down into a shift of a whole number of pixels and a shift of a fraction of a pixel. It may be that the integer shift is used to define a location for a further frame portion, i.e. the location of the preceding frame portion is translated by the integer shift to give the location for the further frame portion. It may be that the pixels forming the further frame portion, corresponding to a re-located region of interest, are extracted.

It may be that an image deblurring step is performed. It may be that deblurring of the summed image is carried out using equations formulated within the image domain.

It may be that the super-resolution algorithm is carried out only on the pixels of the current frame portion that overlap with the pixels of the previously calculated current super-resolved frame portion. It may be that the super resolution algorithm is carried out on all pixels of both the current frame portion and the previously calculated super-resolved frame portion (i.e. including all boundary regions). It may be that the super resolution algorithm is carried out using only the pixels corresponding to the pixels of the frame portion of the first pass of the method.

It may be that the super resolved frame portions are output to a user. Alternatively, it may be that the superresolved frame portions are passed to a further automated unit, where they are used in further automated processes.

A second aspect of the invention provides an image-processing apparatus comprising:
 (i) an imager for obtaining an image including a target object, the image being formed by an array of pixels;
 (ii) an image processor configured to
  a. extract a current frame portion from the image, the frame portion being at least a portion of the pixels forming the image, corresponding to a region of interest in the image, the region of interest comprising the target object;
b. obtain a previously calculated current super-resolved frame portion, corresponding to the region of interest in the image; and
c. calculate an updated super-resolved frame portion from the current frame portion and the current super-resolved frame portion.

It may be that the image processor is configured to calculate an updated super-resolved frame portion by a calculation that applies relative weightings to the current frame portion and the current super-resolved frame portion. The weightings may be applied in a predetermined manner.

It may be that the image processor includes a frame grabber configured to obtain the image from the imager. It may be that the image processor includes a region of interest extraction module, to which the frame grabber provides the obtained image.

It may be that the image-processing apparatus includes a graphical user interface for a user to define the region of interest.

It may be that the image-processor includes a shift calculator configured to provide information regarding a shift of the region of interest in successive images.

It may be that the image-processor includes a cross-correlator.

It may be that the image-processor includes a super-resolution module configured to use a fraction shift of the region of interest, for example in successive images, to create a super-resolved image from a plurality of the images.

It may be that the image processor includes a de-resolution module configured to calculate a de-resolved image and to pass it to a cross-correlator.

It may be that the output from the cross-correlator is passed to the shift calculator.

A third aspect of the invention provides a missile seeker including an image processing apparatus according to the second aspect of the invention.

A fourth aspect of the invention provides a computer program product configured to cause, when the computer program is executed, data-processing apparatus to:
(i) receive an image including a target object, the image being formed by an array of pixels;
(ii) extract a current frame portion from the image, the frame portion being at least a portion of the pixels forming the image, corresponding to a region of interest in the image, the region of interest comprising the target object;
(iii) provide a previously calculated current super-resolved frame portion, corresponding to the region of interest in the image; and
(iv) calculate an updated super-resolved frame portion from the current frame portion and the current super-resolved frame portion.

It may be that the computer program product is configured so that the calculation of the updated super-resolved frame portion applies relative weightings to the current frame portion and the current super-resolved frame portion, optionally in a predetermined manner.

It will of course be appreciated that features described in relation to one aspect of the present invention may be incorporated into other aspects of the present invention. For example, the apparatus of the invention may incorporate any of the features described with reference to the method of the invention and vice versa.

BRIEF DESCRIPTION OF THE DRAWINGS

Example embodiments of the invention will now be described by way of example only and with reference to the accompanying schematic drawings, of which:

FIG. 5 is a flow chart showing steps in a method according to an example embodiment of the invention.

DETAILED DESCRIPTION

Figure 1:
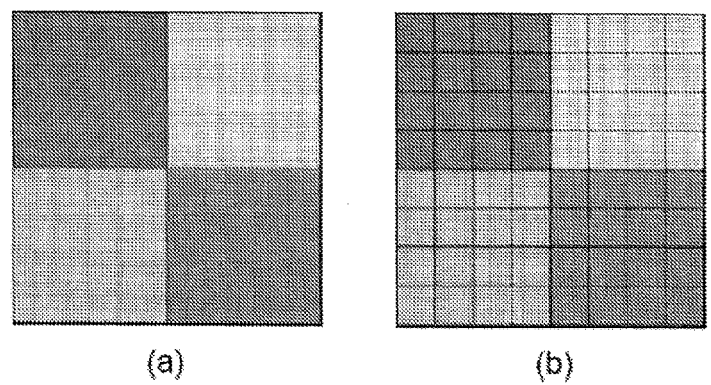
FIG. 1 is a representation of (a) four low-resolution pixels and (b) a corresponding four times sixteen high-resolution pixels.

Super-resolution algorithms have been in the open literature for a number of years, but they are slow.

A straightforward, non-real-time implementation of super resolution takes as its input a stack of low-resolution images and provides as output a single higher-resolution image. To achieve that, three principal processing steps are carried out sequentially, namely registration, summation and deblurring.

In many applications, such as astronomy, in which only a single, still, image is required from a historical image stack, very computationally demanding algorithms have been developed, to generate the best possible super-resolved image. In contrast, in example embodiments of the invention, it is not the best possible super-resolved image that is sought, but rather an image that is 'good enough' and that can be constructed in the time available (e.g. milliseconds), on the hardware available (e.g. embedded processors).

In example embodiments of the present invention, continual super-resolution of a region of interest (ROI) within an image is provided in real time. A typical missile seeker will have a sensor array of at least 320×240 pixels, and for a number of reasons it is not realistic to attempt to super-resolve the entire scene. One reason is processing power and memory requirements: there are simply too many pixels to carry out super resolution in a reasonable time, even with a powerful processor. Another reason is that, if the target motion and background motion are different, it will not be possible to super resolve both and, in a typical scenario where the target is small, doing so would result in an image in which the background was super-resolved but the target was smeared out, which would be worse than the original image. It is desirable instead to super-resolve a small patch of the image denoted as a region of interest (ROI).

The method reduces greatly the processing power and memory required to construct the super-resolution image. This method works with the new ROI and the current super-resolution image, which has been calculated in a previous iteration of the method. At each time step, the new ROI is registered to sub-pixel accuracy with the de-resolved version of the current super resolution image. The current super resolution image is subsequently decayed by a predetermined factor and the new ROI image added; the value of the decay factor dictates how many frames an ROI is included in the super resolution before its contribution becomes negligible.

In the super-resolution of an ROI, the ROI from the most recently captured image is combined with the super-resolved image calculated in the preceding pass of the method. Thus, the super-resolved image is, on each pass of the method, updated with the latest ROI. The weight given in the calculation of the super-resolved image to the ROI from each pass of the method is decreased as the ROI becomes older; i.e. earlier ROIs are given less weight in the calculation than later ROIs.

When provided with an image sequence, a target is defined in the first frame (either by an operator or by some upstream algorithm) and a region of interest around this target extracted. At this stage, super resolution of the ROI yields simply the original ROI.

In subsequent frames, the designated target is tracked and further ROIs are extracted. There are many different ways in which the target could be tracked, but the method used in this example is cross-correlation using a deresolved version of the current super-resolution image. This tracking method is used for two reasons. Firstly, the deresolved version of the super-resolution (SR) image is a prediction of what the image should look like at the base resolution of the sensor. It is inherently very stable, and contains less noise than any of the isolated images because the noise has been averaged out by the SR process. Secondly, a number of the computations carried out to do tracking in this way can be reused by the SR process to reduce computational load.

When provided with a new frame, an image patch is extracted at the approximate location of the ROI. On the assumption that the target motion within the field of view is small, this can simply be the ROI position from the previous frame; if that is not the case a more sophisticated tracker can be used to seed the approximate ROI position. This image patch is registered to sub-pixel accuracy with the deresolved version of the current SR image. The integer part of the computed shift is used to shift the extraction window within the field of view and the new target ROI is extracted, such that only a fractional shift exists. This fractional part of the shift is propagated into the SR algorithm to provide the sub-pixel motion required by the algorithm.

In frame two, the extracted ROI is combined with the frame one ROI in the super-resolution algorithm, with the frame one ROI given a lower weight than the frame two ROI. Moving onto the third frame, the ROI is combined with the super-resolved image calculated from the first and second frames, with the super-resolved image given a lower weight than the ROI, and so on. The SR image will continue to be updated as more ROIs are provided. However, the contribution of each ROI to the super-resolution image is limited, to avoid a large time difference between the newest and oldest ROI (which increases the chance of an image distortion occurring, e.g. a perspective change, which is not modelled by the SR algorithm in this example).

Thus, in this example, the value $S_{x,y}^n$ of the pixel at (x,y) in the super-resolved image frame portion calculated in the nth iteration of the method is:

$$S_{x,y}^n = (1-\alpha)F_{x,y}^n + \alpha S_{x,y}^{n-1}$$
$$= (1-\alpha)F_{x,y}^n + \alpha((1-\alpha)F_{x,y}^{n-1} + \alpha S_{x,y}^{n-2})$$
$$= (1-\alpha)F_{x,y}^n + \alpha((1-\alpha)F_{x,y}^{n-1} + \alpha((1-\alpha)F_{x,y}^{n-2} + \alpha S_{x,y}^{n-3})) = \ldots$$
$$= \alpha^{n-1}F_{x,y}^1 + (1-\alpha)\cdot(\alpha^{n-2}F_{x,y}^2 + \ldots \alpha^2 F_{x,y}^{n-2} + \alpha F_{x,y}^{n-1} + F_{x,y}^n)$$
$$= \alpha^{n-1}F_{x,y}^1 + (1-\alpha)\sum_{p=2}^{n}\alpha^{n-p}F_{x,y}^p$$

where $F_{x,y}^n$ is the (x,y) pixel of the current (i.e. nth iteration) frame portion and $\alpha$ is a constant decay factor, where $0<\alpha<1$, and $S_{x,y}^1=F_{x,y}^1$. It will be seen that as $\alpha$ tends to unity, the current frame portion contributes less to the updated super-resolved frame portion, whereas as $\alpha$ tends to zero, the previous frame portions (and therefore the super-resolved frame portions) contribute less to the updated super-resolved frame portion. Thus, in between these two extremes the value of $\alpha$ dictates the proportion of relative contribution to the updated super-resolved frame portion, as between the current frame portions and previous frame portions.

The previously computed image registrations do not need to be adjusted, as they are all already incorporated into the current SR image. After this process, the super-resolution calculation only uses ROIs that differ by a fraction of a pixel, as the integer pixel shift has been accounted for in the extraction process. The traditional first step of super-resolution processing is to compute the registration of all the images to a single master image, but in this example method that has already been computed, and so is not repeated; instead it is an input to the main super-resolution processing function, which computes the sum of the present ROI and the previous super-resolved ROI, and carries out deblurring.

The summation process comprises enlarging the ROI pixels by the super-resolution scale factor and averaging the image pixels accounting for the sub-pixel shift and the weighting factor. With the summed image calculated, deblurring can optionally be carried out, to remove blurring that may be inherent in the super-resolution process, and also any additional blur that may have been incurred from the image capture process. Suitable deblurring methods are known in the art. Some such deblurring methods are iterative in nature. Every iteration of such deblurring methods is computationally expensive and hence, for real-time applications, it is not feasible to iterate to convergence, and instead only a fixed number of iterations are computed, if indeed deblurring is deemed necessary in the context of the present embodiment. The deblurring algorithm is often described in the literature in lexicographic notation, in which images are expressed as column vectors, which allows an easy exposition of the formulae involved; however, to write software in this way would result in very large (but sparse) matrices. In cases where deblurring is used in the present embodiment, the method employed is preferred to be carried out within the image domain (i.e. a deblurring operation in the form of a convolution rather than a matrix multiplication).

The resultant production of real time super-resolution images allows enhanced performance of, for example, an electro-optical sensor, allowing reductions in cost, weight and development risk. The system can present improved images for example to an operator in the loop or to downstream algorithms.

Aspects of example embodiments of the invention will now be further discussed in more detail.

The first part of most super-resolution (SR) algorithms is image registration, in which multiple low-resolution (LR) images are registered to one another. There are various ways to calculate the translational shift between a pair of images. Correlation in the spatial domain is a robust method but relatively slow to implement, especially for large images. A much faster method, but not as robust for small images, is phase correlation in the frequency domain. In a further, iterative, method the result from one of the two previous methods is used as an initial guess to construct an estimated SR image and the registration is iterated to produce the optimal SR image.

As described above, after calculation of the pixel shifts necessary for image registration, the latest ROI and the latest super-resolved image are summed. In this method, the LR ROI image is up-scaled to the pixel density desired for SR, using nearest neighbour interpolation. The up-scaled ROI image and the latest super-resolved image are then stacked on top of each other at the correct location using the pixel shifts calculated previously. The weighted sum of all the pixel values is then taken for each SR pixel, generating a single, updated SR image. That process may generate an image that is blurred, even if all the registration parameters are known exactly, and so the final (optional) step of the super resolution process is to deblur the resulting updated SR image.

Thus, the first step of a super-resolution algorithm, but a step which is scantly mentioned in the super-resolution literature, is to register a sequence of low resolution images with each other to within sub-pixel accuracy. Three different example methods of aligning the images are described in turn below. All of these example methods assume that the only motion between images is translational motion, with other types of motion such as rotation and scale change not accounted for; that forces each transformation vector to contain two elements, indicative of a horizontal and a vertical translation. Such translational motion could occur for example as a result of jitter at the lens of the camera, caused for example by a camera travelling on a moving vehicle or aircraft, or by target motion within the scene. In the case of a stationary camera with target motion within the scene, the image is close-cropped to the target so that image registration algorithms are not deceived by the stationary background.

In these examples, all images are registered relative to the first image of the sequence. With this choice, the initial transformation vector is equal to zero and all subsequent transformation vectors contain the horizontal and vertical displacement of the current image from image 1. This framework is used in descriptions of the different methods below, in which it is assumed only two images, image 1 and image 2, need to be registered together; the registration process is then repeated for each subsequent image.

Correlation in the spatial domain is an intuitive and robust, yet relatively slow, computational method for image registration. In this method, the two images are overlaid on top of each other at different integer pixel displacements and correlation carried out on the overlapping region. The correlation is, in this example embodiment, computed from the absolute value of the difference between each pair of pixels: the mean of those values, taken across the entire region, gives a measure of how well the two images align (it will be appreciated that different correlation techniques, such as "difference squared" methods could be used in alternative embodiments.). With perfect overlap, the mean pixel difference vanishes, and hence the lower this measure the better the alignment. The process is continued at all integer pixel displacements within a predefined overlap, to build a correlation surface. The predefined overlap can be made larger for an increase in the speed of computation or reduced to allow larger motion to be accounted for; a value of 66% could be chosen for example, i.e. an image is assumed to have translated by less than a third of its width or height.

Upon completion of the correlation surface, the integer pixel displacement of image 2 from image 1 can be computed by finding the location of the minimum value of the array. In order to extend this estimate to include sub-pixel shifts, we consider the correlation surface about this minimum. By fitting a quadratic function through values of the minimum point and the two points adjacent to it, above and below, and subsequently finding the location of the minimum of this function, an estimate of the vertical sub-pixel displacement is obtained; repeating similarly in the horizontal direction provides a complete sub-pixel position. (This example method assumes there is no coupling between the vertical and horizontal directions.)

A very fast (and for large images robust) alternative method of determining the registration of two images is to carry out phase correlation in the frequency domain. This is a well-tested method of calculating integer pixel shifts which has been recently extended to incorporate sub-pixel shifts.

If it is known that two images are identical except for a translation, it is possible to write one as a function of co-ordinates that are shifted by a fixed amount relative to the co-ordinates of the other. The phase correlation matrix is defined as the normalised cross-power spectrum between the Fourier transforms of those functions when so written. Taking the inverse Fourier transform of the phase correlation matrix yields a delta function centred at the translation, and hence yields the translation itself.

Typically, in the case of integer pixel shift, the phase-correlation method provides a much stronger and more detectable peak than that obtained through spatial correlation; however, when dealing with fractional pixel shifts the delta function peak becomes spread over multiple pixels making determination of the shift inaccurate.

One method to overcome this problem is to over-sample the images to higher resolution before carrying out phase correlation; however, this will dramatically increase computational loading. The approach taken in this example is to solve the problem in the frequency domain, and hence to eliminate the need to compute an inverse Fourier transform. In the frequency domain, the only relevant variable is the phase shift, containing the two unknown parameters of the translation. The phase shift, when unwrapped from the inherent 2*pi wrapping, forms a plane which passes through the origin and hence from this plane one can determine the values of the parameters of the translation.

A third approach is to carry out image registration at the same time as optimising the super-resolution image with an iterative method. Assuming an initial registration, which could simply be that each image has zero shift, or using one of the above methods to provide a preliminary estimate, an initial super resolution image is constructed. From this estimate of the real world scene the observation model can be applied, without noise or blur terms, to approximate the original LR images. This equates to carrying out averaging over high resolution (HR) pixel blocks to estimate the LR pixel values. These estimated LR images can be compared with the original LR images and the registration adjusted until some cost measure is minimised.

After generating an estimate of the image registration, a first approximation to a super-resolution image can be constructed by stacking the current ROI on top of the latest super-resolved image, taking into account the relevant pixel shifts. A resolution enhancement factor is chosen to be an integer m, greater than unity, and each LR pixel in the ROI is divided into m×m HR pixels, which is equivalent to image enlargement by a factor of m using nearest neighbour interpolation. FIG. 1 shows an example of that process, with m=4. FIG. 1(*a*) shows an exemplary 2×2 grid of low-resolution pixels. FIG. 1(*b*) shows the corresponding 8×8 grid of high-resolution pixels, following nearest-neighbour interpolation. The value of each pixel of the LR grid is assigned to a 4×4 block of pixels of the HR grid.

The translational shift has been computed on the LR scale and hence must also be multiplied by m to scale it to the HR grid. It is then rounded to the nearest integer, yielding a new shift vector. (In the case of a non-integer shift it is possible to carry out image interpolation to the nearest integer pixel; however, that has the disadvantage that it can introduce information that was not present in the original scene.)

Figure 2:
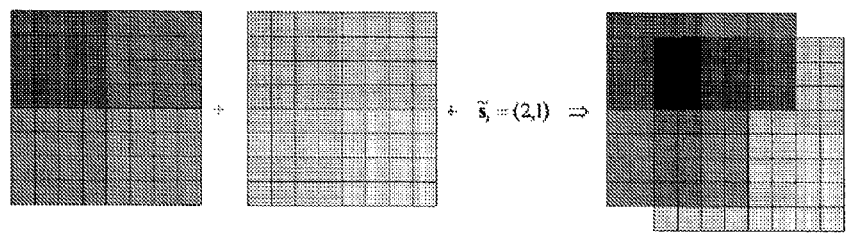
FIG. 2 is a representation of two low-resolution images and their combination.

The up-scaled LR image is subsequently translated by the relevant translational shift vector. As an example, FIG. 2 shows two 8×8 HR grids combined following translation of the second grid relative to the first by two columns of pixels across and one row down. As can be observed in FIG. 2, the region of overlap between images is smaller than each LR image itself and hence extra information for the purpose of super resolution is not gained across the entire image. A choice is therefore made as to how boundary regions are dealt with in the SR algorithm, with options comprising:

Taking only the region of the HR image in which all ROI LR images overlap; with a substantial number of LR images and a wide translational shift this could result in an image with considerably less coverage than the original images;

Taking all pixels including all boundary regions, this could result in a much larger image than the original image; or Taking only the pixels from the original image (i.e. the first image)

In all the work that follows, the third option, taking only pixels that are present in the original image, is chosen. The HR image in this case has pixels around the boundary which do not have contributing pixels from all LR images and also information from LR pixels that fall outside of the original image are discarded. However, this method allows the super-resolved image to be of known size, regardless of the translational shifts, and allows easy comparison with the LR images.

Figure 3:
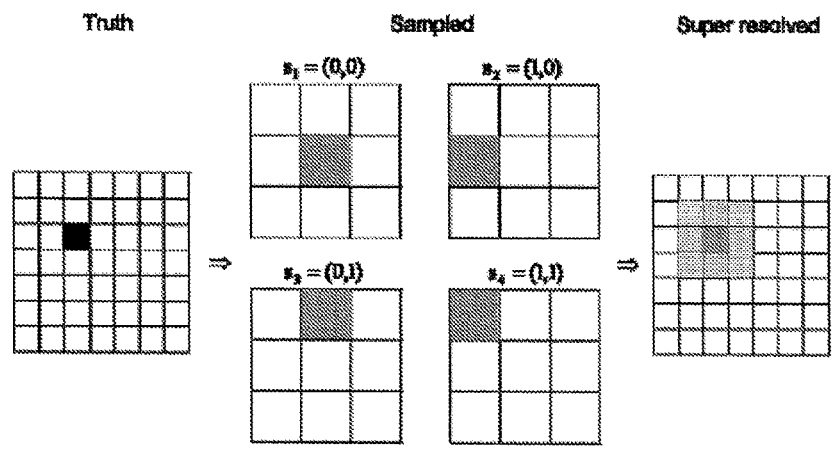
FIG. 3 is an illustration of blurring arising from super-resolution.

The super-resolution image is formed by simply averaging the HR pixels at each location, taking into account how many of the LR images contribute to each pixel. The resulting super-resolution image is a blurry representation of the real-world scene, resulting from blur from the optical system and atmospheric turbulence, but also from blur inherent in the simple stacking super resolution process, as shown in FIG. 3. In FIG. 3, a single pixel at location (3,3) in a (high-resolution) 7×7 grid is down-sampled by a scale factor of two, producing four low-resolution images, each shown on a 3×3 sample grid. The down-sampling process takes a 2×2 patch from the HR image and averages the values to form the LR pixel value. The four samples corresponding to displacements of (0,0) (i.e. no displacement), (1,0) (i.e. displacement by one row, (0,1) (i.e. displacement by one column) and (1,1), i.e. displacement by one row and one column. Those are all possible sub-pixel shifts, as any further shifts result in an integer shift on the low-resolution grid, and hence no extra information to assist super-resolution. In the four 3×3 samples, the pixel occurs in location (2,2), (2,1), (1,2) and (1,1), respectively. Applying the super-resolution simple stacking technique accurately locates the pixel at its location (3, 3) in the 7×7 grid, but the image of the pixel is spread into the nine pixels immediately adjacent to that location. If the original pixel is taken to have an intensity value of 16, the sampling and super-resolution blurring process can be understood as follows:

$$\begin{pmatrix} 0 & 0 & 0 & 0 & 0 & 0 & 0 \\ 0 & 0 & 0 & 0 & 0 & 0 & 0 \\ 0 & 0 & 16 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} \Rightarrow$$

$$s_1(0,0): \begin{pmatrix} 0 & 0 & 0 \\ 0 & 4 & 0 \\ 0 & 0 & 0 \end{pmatrix} s_2(1,0): \begin{pmatrix} 0 & 0 & 0 \\ 4 & 0 & 0 \\ 0 & 0 & 0 \end{pmatrix}$$
$$s_3(0,1): \begin{pmatrix} 0 & 4 & 0 \\ 0 & 0 & 0 \\ 0 & 0 & 0 \end{pmatrix} s_4(1,1): \begin{pmatrix} 4 & 0 & 0 \\ 0 & 0 & 0 \\ 0 & 0 & 0 \end{pmatrix} \Rightarrow \begin{pmatrix} 0 & 0 & 0 & 0 & 0 & 0 & 0 \\ 0 & 1 & 2 & 1 & 0 & 0 & 0 \\ 0 & 2 & 4 & 2 & 0 & 0 & 0 \\ 0 & 1 & 2 & 1 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

The blur is reduced or eliminated by applying traditional deblurring algorithms, such as a Wiener filter, the Lucy-Richardson algorithm or blind deconvolution, using the point spread function of the super-resolution.

Figure 4:
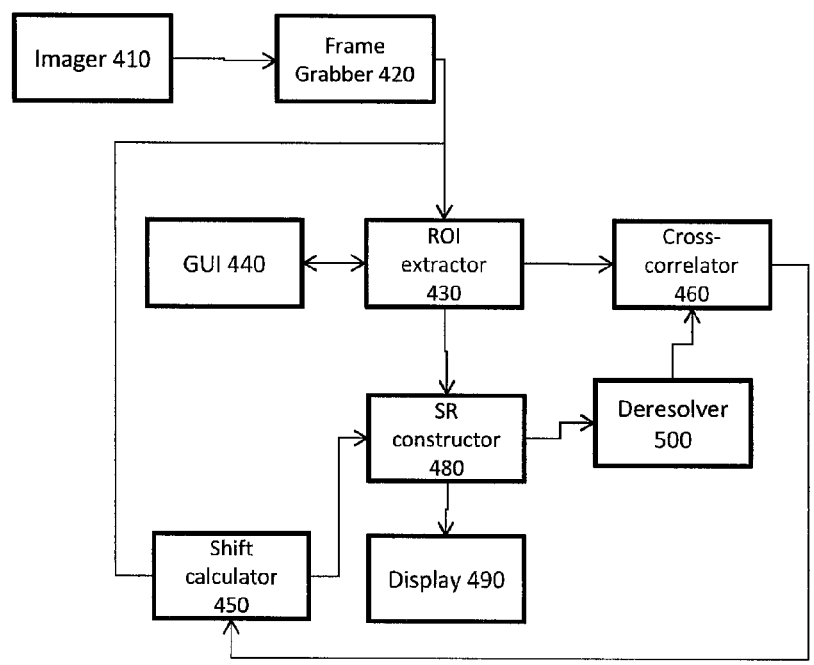
FIG. 4 is a block diagram showing components of an apparatus according to an example embodiment of the invention.

An example embodiment of the invention will now be described in more detail (FIG. 4). An imager 410—for example an image signal feed from a digital camera mounted on an aerial vehicle—provides a stream of images. Respective images from that stream are extracted by a frame grabber 420 and provided to a Region of Interest extraction module 430. On a first pass of the method, the ROI extraction module 430 interfaces with a user, via a Graphical User Interface 440, to define a region of interest. In subsequent passes, the region of interest is identified using integer shift information provided by a shift calculator 450. The ROI extractor 430 supplies the ROI to a super-resolution module 480, which, using the ROI, fractional shift information from the shift calculator 450 and a current super-resolved image (calculated in the preceding pass of the method), calculates an updated super-resolved image. The updated super-resolved image is presented on a display 490 to a user. The image is also passed to a de-resolution module 500, which in turn passes a de-resolved image to the cross-correlator 460. The output from the cross-correlator 460 is passed to the shift calculator 450.

The example method will now be described in more detail, with reference to FIG. 5. An image frame is loaded (step 510) by the frame grabber 420 from the imager 410. The image frame is in the form of an array of pixels. If this is the first pass of the method (decision step 520), a user uses the GUI 440 to identify the location of a target object in the image frame. The user defines in the image frame a portion that is a region of interest including the target object (step 530). Typically, the frame portion will be the pixels making up the target object, together with a small border surrounding the target object, providing a margin in the frame, to allow for future movement of the object in subsequent frames. The pixels corresponding to the identified frame portion (i.e. the region of interest) are extracted by the ROI extractor 430 from the frame. As this is the first pass of the method, the region of interest is up-sampled to the super-resolution resolution and provided to the super-resolution module 480 (step 650).

The super-resolution module 480 provides a decayed super-resolved image (step 540)—as this is the first pass of the method, the decayed super-resolved image is merely the up-sampled ROI.

The super-resolution module 480 constructs a super-resolved image (step 550)—again, as this is the first pass of the method, the super-resolved image is directly related to simply the up-sampled ROI.

The super-resolved image is output to the display 490 (step 560). A "de-resolved" image 575 is calculated (step 570), by a de-resolution module 500, from the "super-resolved" image, for use in subsequent passes; again, in the first pass, the "de-resolved" image 575 is effectively identical to the first frame portion.

After the first pass is completed, the method begins again for a second pass.

A second image frame is loaded by the frame grabber 420 (step 510). A working frame portion is extracted (step 580) from the second image frame by the ROI extractor 430. The working frame portion is extracted from the approximate location of the target object, in this example the same set of pixel locations as were extracted to form the first frame portion.

Next, the working frame portion is cross-correlated (step 590), in the cross-correlator 460, with the de-resolved image produced by the de-resolution module 500 in the first pass of the method. The change in position of the target in the working frame portion compared with the position of the target in the de-resolved first-pass image is thereby calculated by the shift calculator 450 (step 600). That change in position is broken down into a shift of a whole number of pixels (i.e. an integer shift 610) and a shift of a fraction of a pixel (i.e. a fractional shift 620). The integer-shift 610 is used to define a location for a second frame portion, i.e. the location of the first frame portion is translated by the integer shift 610 to give the location for a second frame portion. The pixels forming the second frame portion, corresponding to a re-located region of interest, are extracted (step 630).

A super-resolved image is constructed (step 550) by the super-resolution construction module 480 from the super-resolved image calculated in the first pass of the method (which is merely the frame portion stored in the first pass) and the second frame portion. In the calculation of the super-resolved image, the first frame portion is decayed (step 540) by reducing its weighting; thus, the second frame portion is given a higher weighting than the first frame portion (i.e. $S_{x,y}^2 = (1-\alpha)F_{x,y}^2 + \alpha S_{x,y}^1 = (1-\alpha)F_{x,y}^2 + \alpha F_{x,y}^1$). The super-resolved image is output (step 560) to the display 490 for a user. A de-resolved image 575 is calculated (step 570) from the super-resolved image by the de-resolution module 500, and used in the cross-correlator 460 (step 590) for determination of the location of subsequent frame portions.

In subsequent passes, the method carried out in the second pass is repeated, each time using the location of the frame portion of the previous pass as the location of the working frame portion for the present pass, and using the de-resolved image 575 from the previous pass in the cross-correlator 460 to determine the change in position of the target. Thus, a further image frame is loaded (step 510). A working frame portion is extracted from the further image frame (step 580). The working frame portion is extracted from the approximate location of the target object, in this example the same set of pixel locations as were extracted to form the previous frame portion.

In step 590, the working frame portion is cross-correlated with the de-resolved image 575 from the preceding pass of the method. The change in position of the target in the working frame portion compared with the position of the target in the de-resolved image 575 is thereby obtained. That change in position is broken down (step 600) into a shift of a whole number of pixels (i.e. an integer shift 610) and a shift of a fraction of a pixel (i.e. a fractional shift 620). The integer shift 610 is used to define a location for a further frame portion, i.e. the location of the preceding frame portion is translated by the integer shift 610 to give the location for the further frame portion. The pixels forming the further frame portion, corresponding to a re-located region of interest, are extracted (step 630).

The super-resolved image calculated in the preceding pass of the method is decayed (step 540), by reducing the weighting associated with the frame portions generated in each of the preceding passes; thus, the weighting given to each frame portion is progressively reduced on each pass of the method, so that older frame portions have a lower weighting than newer frame portions. A super-resolved image is constructed (step 550) from the decayed super-resolved image and from the current frame portion, $(S_{x,y}^n = \alpha^{n-1} F_{x,y}^1 + (1-\alpha) \cdot (\alpha^{n-2} F_{x,y}^2 + \ldots + \alpha F_{x,y}^{n-1} + F_{x,y}^n) = \alpha^{n-1} F_{x,y}^1 + (1-\alpha) \Sigma_{p=2}^n \alpha^{n-p} F_{x,y}^p$, as discussed above) and output to a user (step 560). A de-resolved image 575 is calculated (step 570) from the super-resolved image, and used in the cross-correlation (step 590) for determination of the location of subsequent frame portions.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the example embodiment described above, the target is identified in the image frame by a user, and the region of interest for which the image portion is extracted is defined by the user. In alternative embodiments, one or both of those operations is automated. For example, the target may be identified in the image frame by a target-recognition algorithm. Similarly, the region of interest, and hence the extracted frame portion, comprising the target object may be defined by a computer around the target object once the location of the target object itself has been identified, whether automatically or by a user. In another example embodiment, a user defines the region of interest after a target-recognition algorithm has identified the target.

In the example embodiment described above, the calculations for producing a "super-resolved" "decayed super-resolved" and "de-resolved" image are carried out even on the first pass of the method, which results in the first "super-resolved" and "decayed super-resolved" and "de-resolved" images being identical to the first frame portion. In alternative embodiments, the super-resolution, decayed super-resolution and/or de-resolution calculations are bypassed for the first pass.

In the example embodiment described above, the target is relatively slow moving, and the region of interest defined during the first pass is large enough for the working frame portion to be the same set of pixel locations as were extracted from the first frame portion. In alternative embodiments, in which the target moves faster, or in which a smaller region of interest is defined, the likely location of the target is estimated from the presumed movement of the target, or measured using some other tracking algorithm, so that the working frame portion is a region of interest around the estimated likely location of the target. The change in position of the target in the working frame portion compared with the position of the target in the de-resolved image is thereby obtained taking into account, as well as the change in position of the target within the frame portion, the shift in the location of the frame portion itself.

In the example embodiment described above, the super-resolved images are output to a user. In alternative embodiments, the super-resolved images are passed to a further automated unit, where they are used in further automated processes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An image-processing method comprising the steps of:
   (i) obtaining a stream of images including a target object, each image of the stream of images being formed by an array of pixels;
   (ii) extracting a current frame portion from an image from the stream of images, the current frame portion being at least a portion of the pixels forming the image, corresponding to a region of interest in the image, the region of interest comprising the target object;
   (iii) providing a previously calculated super-resolved frame portion, which has been calculated in a previous iteration of steps (ii) to (iv) of the method, corresponding to the region of interest in the image;
   (iv) calculating an updated super-resolved frame portion from the current frame portion and the previously calculated super-resolved frame portion, both the updated super-resolved frame portion and the previously calculated super-resolved frame portion being weighted with respective weightings in the calculation, the weightings being applied on a frame portion basis such that for each frame portion the same weighting is applied to all pixels in the frame portion; and
   (v) repeating for a plurality of times steps (ii) to (iv) of the method for successive images, wherein the respective weightings used in the calculation of each of the successive updated super-resolved frame portions are such that the effective contribution made to the super-resolved frame portion by a given frame portion progressively decays with each successive calculated super-resolved frame portion.

2. A method as claimed in claim 1, in which the previously calculated super-resolved frame portion is decayed by giving it a higher weighting in the calculation of the updated super-resolved frame portion than a weighting given to the current frame portion.

3. A method as claimed in claim 1, in which the frame portion extracted in each iteration of step (ii) after the first iteration corresponds to a region of interest identified in the image used in the first iteration of step (ii).

4. A method as claimed in claim 1, in which the region of interest is assumed to be in the current image at the position of the region of interest in a previous image.

5. A method as claimed in claim 1, in which the target is tracked between images.

6. A method as claimed in claim 1, in which a translation shift between the current frame portion and the previously calculated super-resolved frame portion is calculated by a correlation in the spatial domain, phase correlation in the frequency domain, or by an iterative method in which correlation in the spatial domain or phase correlation in the frequency domain is used as an initial guess to constructed an estimated super resolved frame portion and registration is iterated to produce the optimal super resolved frame portion.

7. A method as claimed in claim 1, in which the position of the target in the image is determined using cross-correlation with a de-resolved version of a super resolution frame portion calculated in a previous iteration of the method.

8. A method as claimed in claim 1, in which a working frame portion is extracted from the image and used to identify the location of the region of interest.

9. A method as claimed in claim 1, in which an image deblurring step is performed.

10. A method as claimed in claim 9, in which deblurring of the summed image is carried out using equations formulated within the image domain.

11. A method as claimed in claim 1, in which the super resolution algorithm is carried out only on the pixels of the current frame portion that overlap with the pixels of the previously calculated current super-resolved frame portion, or on all pixels of both the current frame portion and the previously calculated super-resolved frame portion, or using only the pixels corresponding to the pixels of the frame portion of the first pass of the method.

12. A method as claimed in claim 1, wherein the region of interest comprises a portion of the pixels less than the number of pixels forming the image.

13. An image-processing apparatus comprising:
   (i) an imager for obtaining a stream of images including a target object, each image of the stream of images being formed by an array of pixels;
   (ii) an image processor including at least one microprocessor configured to
      a. extract a current frame portion from an image from the stream of images, the current frame portion being at least a portion of the pixels forming the image, corresponding to a region of interest in the image, the region of interest comprising the target object;
      b. obtain a previously calculated super-resolved frame portion, which has been calculated in a previous iteration of steps (a) to (d), corresponding to the region of interest in the image;
      c. apply a weighting to the current frame portion and the previously calculated super-resolved frame portion, relative to each other in a predetermined manner, the weightings being applied on a frame portion basis such that for each frame portion the same weighting is applied to all pixels in the frame portion;
      d. calculate an updated super-resolved frame portion from the weighted current frame portion and the previously calculated super-resolved frame portion; and
      e. repeat for a plurality of times steps a to d for successive images, the respective weightings used in the calculation of each of the successive updated super-resolved frame portions being such that the effective contribution made to the super-resolved frame portion by a given frame portion progressively decays with each successive calculated super-resolved frame portion.

14. A missile seeker including an image processing apparatus according to claim 13.

15. A computer program product embodied on non-transitory, computer-readable medium and configured to cause, when the computer program is executed, data-processing apparatus to:
   (i) receive a stream of images including a target object, each image of the stream of images being formed by an array of pixels;
   (ii) extract a current frame portion from an image from the stream of images, the current frame portion being at least a portion of the pixels forming the image, corresponding to a region of interest in the image, the region of interest comprising the target object;
   (iii) provide a previously calculated super-resolved frame portion, which has been calculated in a previous iteration of steps (ii) to (v), corresponding to the region of interest in the image;
   (iv) apply a weighting to the current frame portion and the previously calculated super-resolved frame portion, relative to each other in a predetermined manner, the weightings being applied on a frame portion basis such that for each frame portion the same weighting is applied to all pixels in the frame portion;
   (v) calculate an updated super-resolved frame portion from the weighted current frame portion and the previously calculated super-resolved frame portion; and
   (vi) repeat for a plurality of times steps (ii) to (v) for successive images, the respective weightings used in the calculation of each of the successive updated super-resolved frame portions being such that the effective contribution made to the super-resolved frame portion by a given frame portion progressively decays with each successive calculated super-resolved frame portion.

* * * * *